R. A. COFFMAN.
LUBRICANT CATCHING AND DEFLECTING MEANS FOR PISTON RODS.
APPLICATION FILED APR. 3, 1918.

1,293,342.

Patented Feb. 4, 1919.

WITNESS.
Walter H. Troemel

INVENTOR
Roscoe A. Coffman
BY
Bradford & Doolittle
ATTORNEYS

UNITED STATES PATENT OFFICE.

ROSCOE A. COFFMAN, OF INDIANAPOLIS, INDIANA, ASSIGNOR TO SWARTZ ELECTRIC COMPANY, OF INDIANAPOLIS, INDIANA, A CORPORATION OF INDIANA.

LUBRICANT CATCHING AND DEFLECTING MEANS FOR PISTON-RODS.

1,293,342.

Specification of Letters Patent.

Patented Feb. 4, 1919.

Application filed April 3, 1918. Serial No. 226,527.

*To all whom it may concern:*

Be it known that I, ROSCOE A. COFFMAN, a citizen of the United States, residing at Indianapolis, Marion county, and State of Indiana, have invented and discovered certain new and useful Improvements in Lubricant Catching and Deflecting Means for Piston-Rods, of which the following is a specification.
My invention relates to lubricant catching and retaining means for pistons of internal combustion engines, and its object is to provide means for preventing the lubricant, or the fuel carrying the lubricant, in those engines in which the lubricant is injected into the cylinder from being dispersed against the walls of the cylinder and to effect its direct application to and retention upon the piston rod, thereby economizing in material and obtaining better lubrication. This invention is particularly applicable to two-cycle engines.

With this object in view, my invention is embodied in preferable form in the construction hereinafter described and illustrated in the accompanying drawings.

Figure 1:
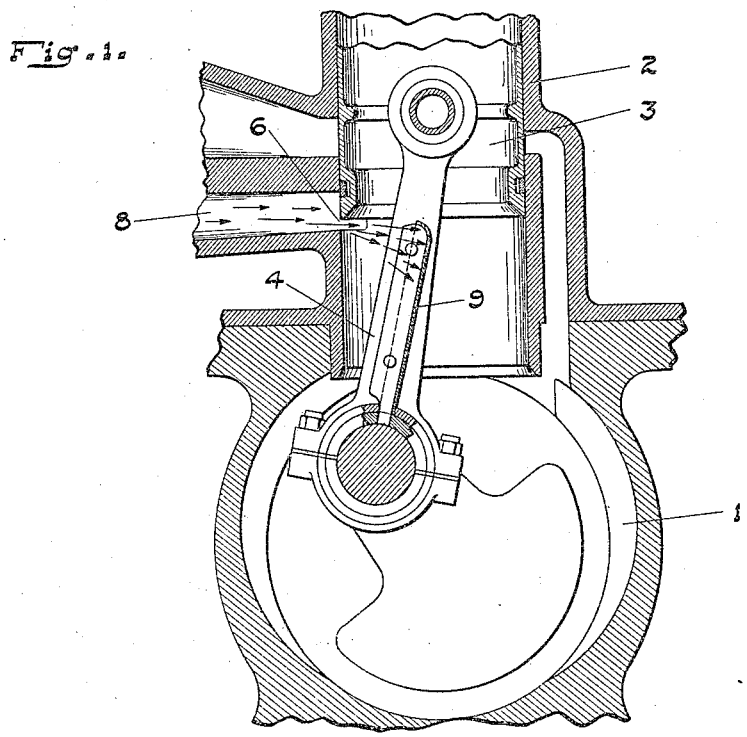
Figure 2:
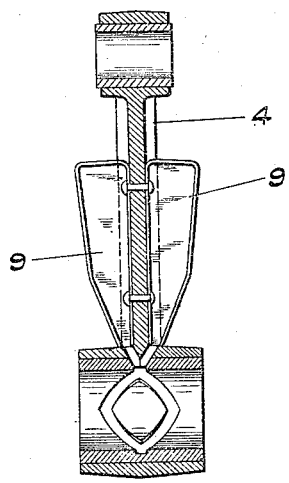

In these drawings, Figure 1 is a vertical section through a part of the cylinder and crank case of a two-cycle internal combustion engine showing my invention applied to the connecting rod, and Fig. 2, a detail vertical section at right angles to Fig. 1.

Referring to the drawings, 1 indicates the crank case, 2, a cylinder and 3, a piston therein. A connecting rod 4 is pivoted to the piston and the invention relates particularly to means for more effectively utilizing the lubricant in oiling the bearings of this connecting rod and guiding the lubricant along the rod to such bearings.

The cylinder is provided with an opening 6 through which the lubricant, preferably mixed with a body of liquid fuel, is injected from a suitable passage way 8. Carried by the connecting rod on opposite faces thereof are deflecting and catching vanes or wings 9 which are riveted or otherwise secured to the rod and the plane faces of which extend at right angles to the faces of the rod. These vanes constitute deflectors and they project from the rods sufficiently to cover the path of the fluid carrying the lubricant injected through the opening whereby as the latter is carried into the cylinder it will strike against these deflectors and be retained and carried along the connecting rod to the bearings thereof, thus effectually preventing the dispersion of the lubricant against the wall of the cylinder and the consequent loss of utilization of part of the lubricant.

Having thus described my invention, what I claim is:—

In combination with the piston rod of an internal combustion engine and its containing chamber to which a lubricant is adapted to be admitted, lubricant deflecting means carried by the said rod and consisting of vanes extending on opposite sides of the rod and into the path of the injected lubricant with the planes of their faces at right angles to the path of said injected lubricant.

In witness whereof, I have hereunto set my hand and seal at Indianapolis, this 23rd day of March, A. D. 1918.

ROSCOE A. COFFMAN. [L. S.]

Witnesses:
C. K. BURDICK,
H. O. VOTAW.

Copies of this patent may be obtained for five cents each, by addressing the "Commissioner of Patents, Washington, D. C."